March 26, 1963   E. O. YOUNG ETAL   3,082,679
DAMPER OPERATING MECHANISM
Filed Jan. 23, 1961   3 Sheets-Sheet 1

INVENTORS
E. O. Young and
W. J. Guinther
BY Robb & Robb
Attorneys.

March 26, 1963 E. O. YOUNG ETAL 3,082,679
DAMPER OPERATING MECHANISM
Filed Jan. 23, 1961 3 Sheets-Sheet 2

INVENTORS
E.O. Young and
W.J. Zimmer
BY Robb & Robb
Attorneys.

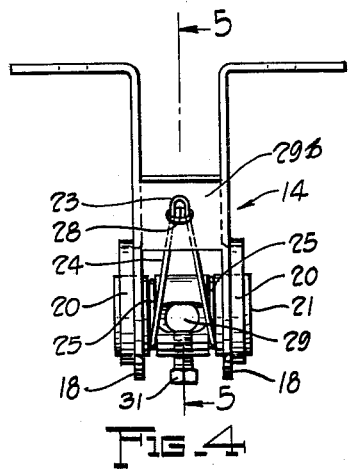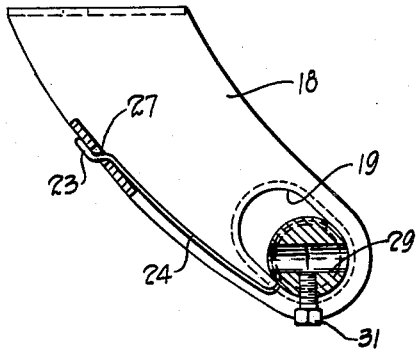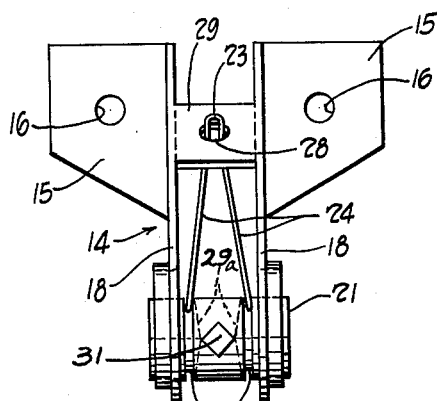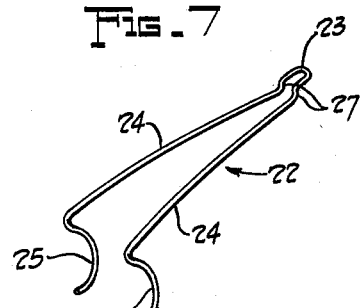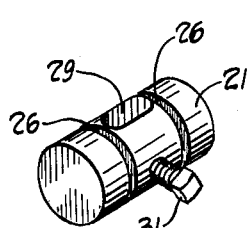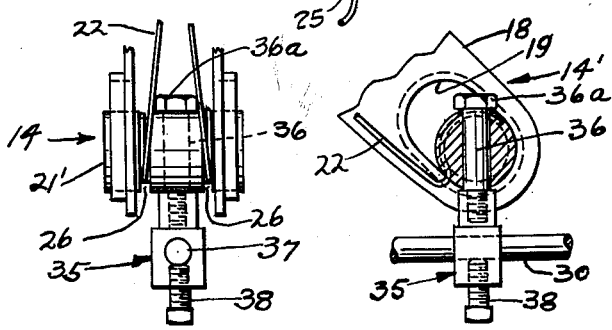

United States Patent Office 3,082,679
Patented Mar. 26, 1963

3,082,679
DAMPER OPERATING MECHANISM
Emil O. Young, Shaker Heights, and Wilfred J. Zimmer, Parma, Ohio, assignors to Young Regulator Company, Warrensville Heights, Ohio, a partnership
Filed June 23, 1961, Ser. No. 84,341
11 Claims. (Cl. 98—110)

Our present invention appertains to damper hardware, and more particularly to damper operating mechanism for operating a plurality of damper blades in unison to control the flow of air or like medium through a duct.

The present invention is especially applicable for use in conjunction with custom constructed damper devices, or those which are constructed or assembled in the field, which are made without the benefit of costly assembly jigs and tools to assure accuracy in installation of the blade or door pivots and the actuating connectors therefor. Such damper devices, constructed in the manner indicated, are subject to problems in assembly and in operation due to irregularities arising from faulty or inaccurate construction of the frame, positioning of the pivotal mountings of the damper blades or doors, and positioning of the damper blade actuating connectors, any one of which faults may produce mis-alignment of the damper operating parts causing binding of the damper actuating mechanism preventing proper operation thereof.

It is therefore a principal object of this invention to provide damper operating mechanism including coupling means for interconnecting the damper blades with a common connecting rod, which coupling means is constructed and arranged in a manner to compensate for irregularities in construction and positioning or mounting of such coupling means and/or other parts of the damper.

A still further object of the invention is to provide such coupling means which is of relatively simple construction, inexpensive to manufacture, easy to install, and relatively foolproof in operation.

In carrying our invention into practice, we provide coupling means for the purpose indicated embodying a pivotal connection between each damper blade and the common actuating rod, which pivotal connection is movable along its own axis, and its axis is yieldably movable to different positions relative to its mounting, and which permits variation of axial positioning of the actuator rod relative thereto. To the foregoing end, our invention contemplates the provision of a damper blade actuating bracket for each of the blades of a damper to be actuated in unison, which brackets are secured to the respective blades, each such bracket including an arm or arms offstanding from the blade and having a trunnion bearing near its outer end, a trunnion mounted in said bearing for pivotal movement relative thereto and for movement axially of the trunnion axis, the trunnion bearing permitting yieldable movement of the axis of the trunnion to different positions relative to its mounting, means for connecting an actuator rod to the trunnion, and means for varying the axial positioning of such actuator rod in connected relation to said trunnion.

Other objects, advantages and features of the invention will become apparent upon reference to the following detailed description, taken in conjunction with the accompanying drawings in which:

FIGURE 4 is a top plan view of one of the damper blade actuating bracket assemblies drawn on an enlarged scale.

FIGURE 5 is a sectional view taken substantially on the line 5—5 of FIGURE 4.

FIGURE 6 is a front elevational view of one of the damper actuating bracket assemblies.

FIGURE 7 is a perspective view of the spring member forming a part of the damper actuating bracket assembly.

FIGURE 8 is a perspective view of the trunnion member forming part of the damper actuating bracket assembly.

FIGURE 9 is a view similar to FIGURE 4, partially broken away, illustrating a modification of the invention.

FIGURE 10 is a sectional view similar to FIGURE 5 but showing the modification of FIGURE 9.

Figure 1:
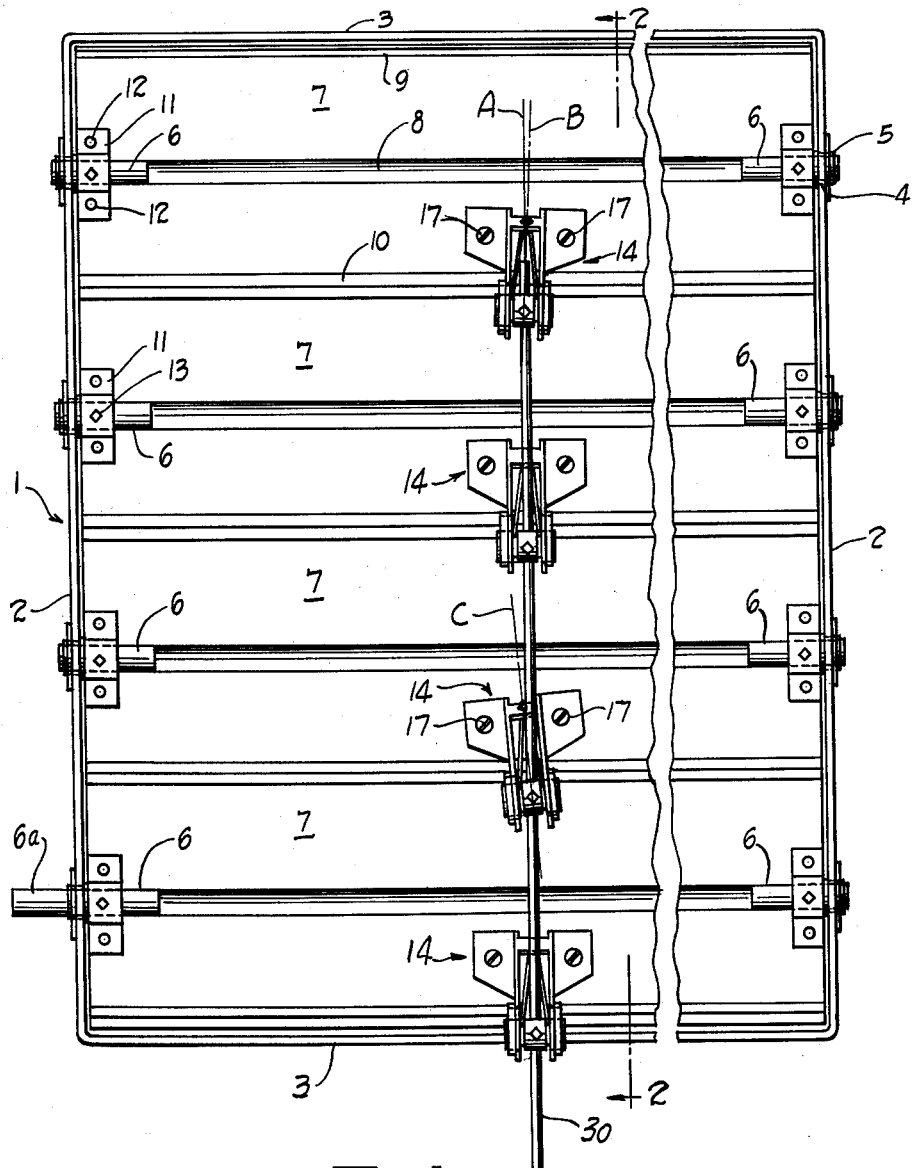
FIGURE 1 is a front elevational view of a damper assembly embodying our invention.

Now referring to the drawings and describing the invention in detail, the same is illustrated in conjunction with a damper installation comprising a rectangular frame 1 comprising vertical frame members 2 and horizontal frame members 3 suitably joined together and of a size and proportion to fit an opening in a ceiling, wall, floor or duct through which it is desired to distribute air or like medium to be controlled by such damper.

Figure 2:
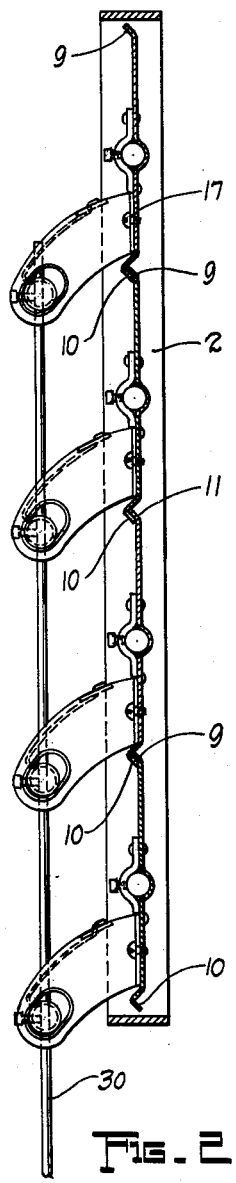
FIGURE 2 is a longitudinal section taken substantially on the line 2—2 of FIGURE 1, showing damper blades closed.

The vertical frame members 2 may be formed with punched holes or bores 4 into which are positioned, by a friction fit, bushings 5 arranged in horizontally aligned pairs to receive bearing pins 6 for pivotally supporting the damper blades 7 which may be made of sheet metal each formed with a central rib 8 and terminal ribs 9 and 10 oppositely bent and conformingly faced to cooperate with adjacent blades to form a sealed or interlocking engagement when the blades are closed as in the condition of FIGURE 2. The central rib 8 forms a seat for the bearing pins 6 which extend into the bushings 5. The pins 6 are held in the seat formed by the central rib 8 by means of overlying straps 11 secured to the blade by rivets 12. Each of the straps 11 is provided with a set screw 13 for locking engagement with the respective pin 6.

Actuating means is provided for operating the damper blades 7 in unison to cause rotation thereof around the pivotal axis of the pins 6 toward open or closed positions. The said actuating means comprises a respective damper actuating bracket, generally designated by the numeral 14, for each damper blade 7. Each bracket 14 comprises base portions 15 having openings therethrough designated 16 for receiving fastening elements such as the screws 17 passing into the respective blade 7 for securing the brackets 14 in position to provide leverage for rotation of the blades 7 around the pivotal axis of the pins 6. Each bracket 14 is formed with spaced arms 18 having trunnion bearings adjacent the outer extremities thereof, which bearings are formed by the openings 19 therethrough formed with the offstanding peripheral flanges or bosses 20. A trunnion 21 is rotatably received in the bearings 19 and is of an axial length to accommodate axial movement of the trunnion relative to the bracket 14. The bearing openings 19 are larger than the diameter of the trunnion 21 so as to accommodate movement of the trunnion axis to different positions relative to the bracket 14 within the trunnion bearings 19. As illustrated, and seen best in FIGURE 5, the bearing openings 19 may be of elliptical configuration elongated in a direction to accommodate movement of the trunnion 21 toward and away from the respective damper blade in respect to the position of the axis of the trunnion within the bearing openings 19.

Spring means is provided for yieldably urging the trunnion toward the walls of the bearing openings 19 which are outermost from the respective damper blade 7. As illustrated, said spring means may comprise the spring member 22 which may be formed of a single length of spring wire formed intermediate its ends with a bend or loop portion 23 from which extend the diverging legs 24 provided at their outer ends with the arcuate portions 25 which are receivable in the annular grooves 26 formed in the trunnion 21 at locations adjacent to but spaced inwardly of the arms 18 when the trunnion 21 is received in the bearing openings 19, as illustrated in FIGURES 4 to 6 inclusive. The legs 24 of the spring member 22 are formed with reverse bends adjacent the loop portion 23 whereby the plane of the latter is offset with respect to the plane of the legs 24 to provide shouldered abutment portions 27 for engagement with the wall of an opening 28 in a saddle portion 29 of the bracket 14. As illustrated, the saddle portion 29b extends between the arms 18 of the bracket and with the trunnion 21 received in the bearing openings 19 and the arcuate portions 25 of the spring member 22 received in the annular grooves 26, the loop portion 23 of the spring member extends through the opening 28 with the shouldered portions 27 engaging the wall of the opening 28 to position the spring member and cause it to urge the trunnion to the position illustrated in FIGURES 4 to 6 inclusive.

The trunnion 21 is provided with an opening 29 extending radially therethrough for receiving an actuator rod 30 which passes through the openings 29 of all of the trunnions 21 of the actuator brackets 14 associated with the damper blades 7 to be operated in unison. The trunnions 21 each being provided with a set screw 31 engageable with the actuator rod 30 for securing the same thereto.

It will be noted that the openings 29 through the trunnions 21 are larger than the diameter of the actuator rod 30 and, as illustrated, said openings may be elongated in the direction of the axes of the trunnions 21, for the purpose of accommodating adjustment of the actuator rod to different axial positions of the rod with respect to the axes of the trunnions 21.

Thus the damper actuating brackets of our invention provide flexible coupling means for coupling the damper blades 7 to the actuator rod 30 in a manner to compensate for various irregularities in the manufacture and assembly of the dampers as regards faulty construction of the frame structure, faulty pivotal mounting of the damper blades, and faulty mounting of the damper actuating brackets themselves.

Figure 3:
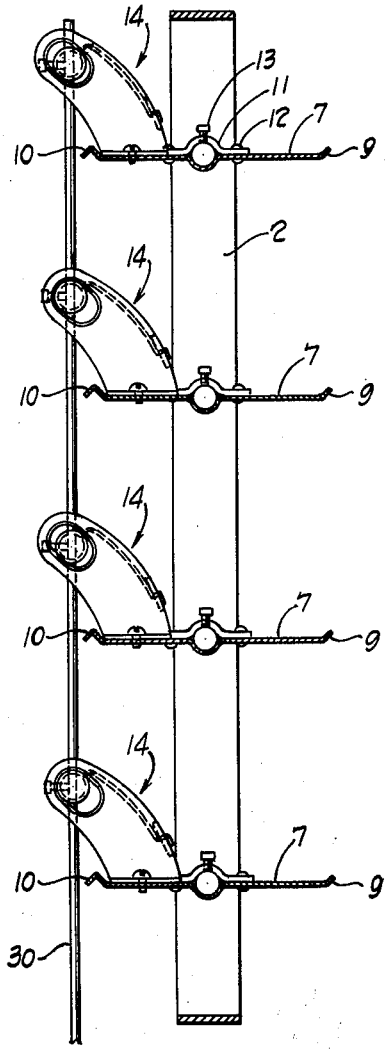
FIGURE 3 is a view similar to FIGURE 2 but showing the damper blades in fully open position.

For purposes of illustration of the adaptability of the coupling means of our invention in use, FIGURE 1 purposely illustrates a faulty positioning of certain of the damper actuating brackets 14. In that figure the letter A designates the longitudinal axis of the actuator rod 30 with which the openings 29 through the trunnions 21 of the several actuator brackets 14 are generally aligned so that said actuator rod passes through all of the openings 29 of said trunnions 21 even though there is faulty positioning of the uppermost actuator bracket 14 which is shown as mis-aligned in a clockwise rotational direction with respect to the axis A as represented by the center line B of that bracket, and even though the actuator bracket located second from the bottom of FIGURE 1 is shown as being mis-aligned in a counter clockwise rotational direction as represented by the center line C of that bracket. The different positioning of the trunnions of these mis-aligned brackets with respect to the bearing openings 19 is illustrated in FIGURES 2 and 3. In the foregoing connection it is notable that the flexible coupling between the damper blades 7 and the actuator rod 30 afforded by the damper actuating bracket assemblies 14 accommodates several kinds of variations between the position of the actuator rod 30 and the actuator brackets 14 and accommodates several variations in the positioning of the trunnions 21 both with respect to the actuator member 30 and with respect to the brackets 14 during actuating movement of the damper blades in unison effected by rotation of the damper blades 7 around the axes of their pivot pins 6.

As illustrated in FIGURE 1, one of the pivot pins 6 may be elongated as at 6a and suitably connected either to a crank or a suitable motorized unit for rotation of the part 6a to effect corresponding rotation and hence opening or closing of the damper blades 7.

From the foregoing it will be understood that the trunnions 21 are yieldably movable in their bearing openings 19 against the action of the springs 22 to vary the disposition of the rotational axis of each trunnion 21 to accommodate the connection of such trunnion 21 to the actuator rod 30 during all phases of rotational movement of the damper blades 7. Also it will be understood that the construction of the actuator bracket assemblies 14 permits movement of the trunnions 21 along their axes to an extent limited only by the engagement of the legs 24 of the springs 22 with the arms 18 of said bracket. It will also be understood that the construction of the trunnions 21 permits variations in positioning of the actuator member 30 along the axes of said trunnions and transversely of the axes of the trunnions as well as rotationally about the axes of the set screws 31 of said trunnions.

Thus the coupling means of the invention affords accommodation for many different faults in the construction and mounting of parts of such dampers and permits smooth operation of the damper blades and associated connecting means during the rotational movement of said blades. It will be apparent that the foregoing is accomplished, according to our invention by a coupling means of relatively simple construction which is relatively inexpensive to manufacture and which is relatively foolproof in operation.

It should be noted that while the entrance portions of the opening 29 through the trunnion 21 are elongated in the direction of the axis of the trunnion, the end walls of said opening 29 are tapered or inclined inwardly from the periphery of the trunnion toward the center thereof as seen best in FIGURES 4 and 6 and indicated at 29a so that the size of the opening 29 at the rotational axis of the trunnion 21 is only slightly larger than the cross-sectional dimension of the actuator rod 30, whereby the rod in passing through the opening 29 is confined within the narrowed portion of said opening so as to insure positive engagement of the set screw 31 with said actuator rod 30 while permitting adjustable movement of the rod 30 within the opening 29 about the axis of the set screw 31.

In FIGURES 9 and 10 there is shown a modified form of damper actuating bracket assembly designated by the numeral 14' wherein the trunnion 21' is similar to the trunnion 21 in respect to the provision of the annular grooves 26 but the trunnion 21' does not have the axially elongated opening 29; instead, the trunnion 21' is provided with a swivel collar 35 swivelly connected to the trunnion 21' on an axis extending at a right angle to the axis of the trunnion 21'. The swivel connection of the collar 35 to the trunnion 21' may be provided by a member 36 integral with or suitably secured to collar 35, member 36 extending through a bore through the trunnion 21' transversely with respect to the axis of the trunnion 21', said member 36 being swivelly connected to the trunnion 21' and provided with a head 36a. The collar member 35 is provided with a passage therethrough designated 37 for receiving an actuator rod such as 30 passing therethrough. A set screw 38 is provided on the collar member 35 for engagement with the rod to secure the same in the desired position thereof.

It will be understood that the modification of FIGURES 9 and 10 similarly provides for yieldable movement of the trunnion to adjust the axis thereof to different positions within the bearings 19 and similarly accommodates movement of the trunnion along its own axis. Also the construction of FIGURES 9 and 10 enables adjustment of the actuator member 30 to different positions along its own axis and allows the actuator 30 to pivot around the swivel axis of the collar member 35.

We claim:

1. Means for coupling a damper blade to an actuator member, comprising a bracket having a pivot bearing, a pivot member pivotally supported in said bearing, the bearing being larger than the pivot portion of the pivot member to permit variations in angular positioning of the axis of the pivot member within said bearing, means for yieldably urging said pivot member to a limiting position within said bearing, and means for securing said pivot member to an actuator member in different positions lengthwise of said actuator member.

2. Means for coupling a damper blade to an actuator member, comprising a bracket member having a pivot bearing, a pivot member pivotally supported in said bearing for axial movement relative to said bracket along the pivotal axis of said pivot member, the bearing being larger than the cross-sectional dimensions of the pivot portions of said pivot member to permit variations in the angular positioning of the pivotal axis of said pivot member within said bearing, means for yieldably urging said pivot member to a limiting position within said bearing, and means for securing said pivot member to an actuator member in different positions lengthwise of said actuator member.

3. Means for coupling a damper blade to an actuator member, comprising a bracket having a pivot bearing, a pivot member pivotally supported in said bearing, the bearing being larger than the pivot portion of the pivot member to permit variations in angular positioning of the axis of the pivot member within said bearing, means for yieldably urging said pivot member to a limiting position within said bearing, and means for securing said pivot member to an actuator member in different positions lengthwise thereof for movement of said actuator member about an axis disposed at an angle to the pivotal axis of said pivot member.

4. A damper actuating bracket assembly of the class described, comprising a bracket member having a pivot bearing, a pivot member pivotally supported in said bearing, the bearing being larger than the pivot portion of the pivot member to permit variations in the angular positioning of the axis of the pivot member within said bearing, means for yieldably urging said pivot member to a limiting position within said bearing, said pivot member having an opening extending therethrough at an angle to the pivotal axis of said pivot member for passing an actuator rod therethrough, said opening being larger than the cross-sectional dimensions of said actuator rod whereby to permit variations in the angular positioning of the axis of said actuator rod within said opening, and means for securing said pivot member to said actuating rod in different positions lengthwise of said rod.

5. A damper actuating bracket assembly of the class described, comprising a bracket member having a pivot bearing, a pivot member pivotally supported in said bearing, said bearing being larger than the cross-sectional dimensions of the pivotal portions of said pivot member to permit variations in angular positioning of the pivotal axis of said pivot member within said bearing, means for yieldably urging said pivot member to a limiting position within said bearing, said pivot member having an opening extending therethrough at an angle to the pivotal axis thereof for passing an actuator rod therethrough, said opening being larger than the cross-sectional dimensions of said actuator rod whereby to permit variations in the angular positioning of the axis of said actuator rod within said opening, and means for securing said pivot member in different positions lengthwise of said rod.

6. A damper actuating bracket assembly of the class described, comprising a bracket having a pivot bearing, a pivot member pivotally supported in said bearing, said pivot member having an opening extending therethrough at an angle to the pivotal axis of said pivot member for passing an actuator rod therethrough, said opening having its entrance portions larger than the cross-sectional dimensions of said rod whereby to permit variations in the angular positioning of the axis of said actuator rod within said opening, and said opening having a constricted portion near the center of said pivot member, the constricted portion being of approximately the same dimensions as the cross-sectional dimensions of said rod whereby to center said rod in said opening, and a locking member on said pivot member and engageable with said rod to lock the pivot member to said rod in different positions lengthwise of said rod.

7. Means as in claim 2, wherein the pivot member comprises a trunnion formed with spaced annular grooves, and the first means comprises a spring formed with a loop portion intermediate its ends and having diverging leg portions extending from said loop portion, said loop portion extending into an opening in the bracket body, and said leg portions being formed with arcuate portions at their outer extremities conforming to and engageable in the annular grooves in said trunnion.

8. Means for coupling a damper blade to an actuator member, comprising a bracket having a pivot bearing, a pivot member pivotally supported in said bearing, means for securing said pivot member to an actuator member in different positions lengthwise of said actuator member, and means yieldably urging the first mentioned means to a limiting position relative to the bracket body, wherein the securing means comprises a collar member for receiving an actuator member passing therethrough, locking means on said collar for engagement with said actuator member to secure the collar to said actuator member in different positions lengthwise thereof, said collar being secured to said pivot member for movement of said actuator member about an axis disposed at an angle to the pivotal axis of said pivot member when the actuator member is locked to the collar member.

9. Means as in claim 2, wherein the securing means comprises a collar member for receiving an actuator member passing therethrough, locking means on said collar for engagement with said actuator member to secure the collar to said actuator member in different positions lengthwise thereof, said collar being secured to said pivot member for pivotal movement relative thereto about an axis disposed at an angle to the pivotal axis of said pivot member when the actuator member is locked to the collar member.

10. Means as in claim 2 wherein the pivot member comprises a trunnion formed with spaced annular grooves, and the first means comprises a spring formed with a loop intermediate its ends and having diverging leg portions extending from said loop portion, said loop portion extending into an opening in the bracket body, and said leg portions being formed with arcuate portions at their outer extremities conforming to and engageable in the annular grooves in said trunnion, and wherein the securing means comprises a collar member for receiving an actuator member passing therethrough, locking means on said collar member for engagement with said actuator member to secure the collar member to said actuator member in different positions lengthwise thereof, said collar member being secured to said pivot member to permit movement of said actuator member about an axis disposed at an angle to the pivotal axis of said pivot member when the actuator member is locked to the collar member.

11. A damper actuating bracket assembly as in claim 4, wherein means is provided in the opening near the center of the pivot member for positioning the actuator rod for cooperation of said securing means therewith.

References Cited in the file of this patent
UNITED STATES PATENTS

| | | |
|---|---|---|
| 2,210,869 | Larson | Aug. 6, 1940 |
| 2,863,374 | Hinden | Dec. 9, 1958 |

FOREIGN PATENTS

| | | |
|---|---|---|
| 785,741 | France | Aug. 17, 1935 |